Jan. 23, 1968　　　　SHIGEO ISHIOKA　　　3,364,794
SPRING TORQUE CONVERTER

Filed April 14, 1966　　　　　　　　　　　　　　4 Sheets-Sheet 1

INVENTOR
SHIGEO ISHIOKA

BY Wenderoth, Lind and Ponack

ATTORNEYS

Jan. 23, 1968  SHIGEO ISHIOKA  3,364,794
SPRING TORQUE CONVERTER

Filed April 14, 1966  4 Sheets-Sheet 2

INVENTOR
SHIGEO ISHIOKA

BY *Wenderoth, Lind & Ponack*

ATTORNEYS

Jan. 23, 1968  SHIGEO ISHIOKA  3,364,794
SPRING TORQUE CONVERTER
Filed April 14, 1966  4 Sheets-Sheet 3
FIG. 7
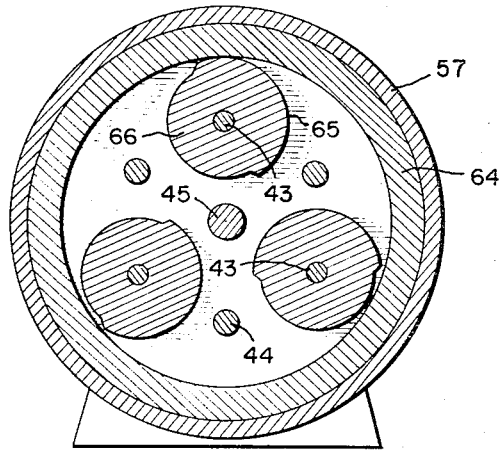
FIG. 8
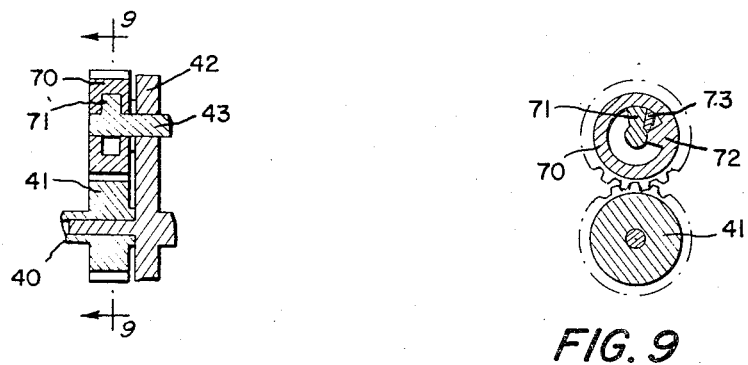
FIG. 9
FIG. 10
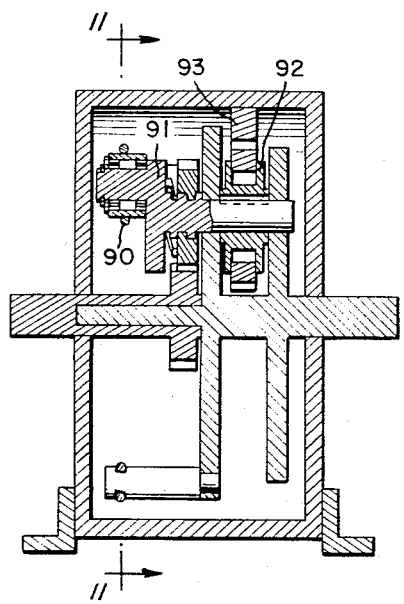
INVENTOR
SHIGEO ISHIOKA
BY Wenderoth, Lind & Ponack
ATTORNEYS Jan. 23, 1968 SHIGEO ISHIOKA 3,364,794
SPRING TORQUE CONVERTER
Filed April 14, 1966 4 Sheets-Sheet 4

INVENTOR
SHIGEO ISHIOKA
BY Wenderoth, Lind & Ponack
ATTORNEYS

United States Patent Office 3,364,794
Patented Jan. 23, 1968

3,364,794
SPRING TORQUE CONVERTER
Shigeo Ishioka, 3–3 Yamate-dori, Showa-ku,
Nagoya-shi, Japan
Continuation-in-part of application Ser. No. 268,797,
Mar. 28, 1963. This application Apr. 14, 1966, Ser.
No. 542,668
Claims priority, application Japan, Apr. 6, 1962,
37/13,993
13 Claims. (Cl. 74—751)

This application is a continuation-in-part of my copending application Ser. No. 268,797 now abandoned.

This invention relates to a spring torque converter for a vehicle such as an automobile.

Heretofore, fluid torque converters have been used as automatic torque converters, but fluid torque converters have disadvantages such as low efficiency, small stall torque ratio, etc. In the spring torque converter, according to the present invention, these disadvantages are eliminated.

The priciple of this invention will first be explained, taking as an example a coupling wherein a spring is used as a buffer device. If the load is suddenly increased during the operation of the coupling, the strain in the spring increases, reducing the rotating speed of the driven shaft to a speed slower than that of the driving shaft, namely an automatic speed change is effected. Where the automatic change in speed is being effected, the torque $T_1$ of the driving shaft is equal to the torque $T_2$ of the driven shaft and the speed of rotation $N_1$ of the driving shaft is greater than the speed of rotation $N_2$ of the driven shaft. Therefore, there is produced an energy difference between the input $E_1$, which is defined as $N_1T_1$, from the prime mover and the output $E_2$, which is defined as $N_2T_2$, to the driven device operated by the prime mover. The difference is energy $E_1-E_2$ is denoted by the following formula:

$$E_1-E_2=T_1N_1-T_2N_2=T_1(N_1-N_2)=E_0$$

The difference $E_0$, referred to as the "differential velocity energy," is stored in the buffer spring as strain energy.

The above-mentioned condition is brought about in a friction clutch when slip is produced in the contacting portions of the friction clutch. The difference between a friction clutch and a coupling having a spring is that in the friction clutch the differential velocity energy is converted to a friction heat generated at the contacting portions so that it is difficult to restore the energy so as to utilize it automatically in the driven device as mechanical energy. On the contrary, in the coupling, because the energy is stored in the spring as strain energy without being lost at all, it is possible to recover the energy automatically and to utilize it to rotate the driven device by employing a suitable device when the differential velocity energy reaches a predetermined value. Under these circumstances, the differential velocity energy is a kind of a source of energy and torque $T_2$ can become larger than torque $T_1$ so that the spring acts as an engine to drive the driven device.

If a mechanism can be devised in which a coupling having a buffer spring therein effects automatic speed changes in succession within an extremely short duration, so that the differential velocity energy which is repeatedly generated due to the automatic speed changes is transmitted to a driven device with high efficiency, the mechanism will operate as an automatic change gear with a good performance.

The present invention utilizes the characteristic features possessed by a spring, i.e. good efficiency in absorbing and discharging energy without any accompanying loss in the energy. In this invention the principle based on these characteristic features is embodied in a spring torque converter which functions as an automatic change gear.

It is therefore an object of this invention to provide an automatic change gear in which a coupling having a buffer spring effects successive automatic speed changes by repeatedly absorbing the mechanical energy of a driving means and by transmitting the absorbed energy to a driven device.

Another object of this invention is to provide a spring torque converter in which a spring coupling a driving means with a driven device effects the absorbing and discharging of the mechanical energy. It is clear that the action of the spring, referred to as an energy transmitting spring, consists of two stages; in one, the strain energy is absorbed in the spring, and in the other the strain energy which has been absorbed is discharged. If the spring being acted on in the former stage is referred to as a primary spring and the spring acting in the latter stage is referred to as a secondary spring, the spring, in principle, automatically repeats the performance of the primary and secondary springs when the spring is in a spring torque converter.

First, the condition in which the spring is acted on as a primary spring will be discussed. It is clear that an energy source from which the mechanical energy is supplied to a driven device is provided. If the energy source is the combustible gas of an internal combustion engine the explosion of the combustible gas increases the strain energy in the spring through the piston, the crankshaft, etc. of the internal combustion engine. The energy transmitting spring absorbs the energy generated due to the explosion of the gas and when the absorption reaches a predetermined value, the energy transmitting spring stops absorbing the energy generated due to the explosion of the gas; in other words, it stops acting as a primary spring and automatically discharges the energy absorbed, or in other words begins to perform the secondary spring action.

Next, the secondary spring acts as an energy source by which mechanical energy is generated, this action being referred to as the action of a spring engine.

There are two types of mechanism in which the operating principle of the present invention can be embodied: one, a "spring action converter," and the other, a "secondary torque generator." In the spring action converter, the energy transmitting spring can repeatedly act as a primary spring and a secondary spring during the relative rotation of the driving shaft and driven shaft; in other words, the energy transmitting spring expands and contracts. When the strain increases the primary torque is necessarily generated. In the secondary torque generator, the secondary torque is generated by the restoring force of the energy transmitting spring when the strain in the spring decreases.

The spring torque converter of the present invention can be used to drive from all kinds of internal combustion engines, such apparatus as induction motors and automobiles, heavy duty machines such as construction machines in order to change the speed of the load automatically.

The spring torque converter of the present invention is a torque converter with a continuous speed change ratio.

These objects and advantages of the spring torque converter of this invention will become apparent from the following specification and drawings in which:

FIG. 7 is a sectional view of a modified form of the spring torque converter shown in FIG. 5;

FIG. 8 is a longitudinal sectional view of an embodiment of an energy feedback preventing apparatus which is a part of the spring torque converter shown in FIG. 5;

FIG. 9 is a sectional view taken along the line 9—9 in FIG. 8;

FIG. 10 is a longitudinal sectional view of still another embodiment of the spring torque converter according to the present invention;

Figure 1:
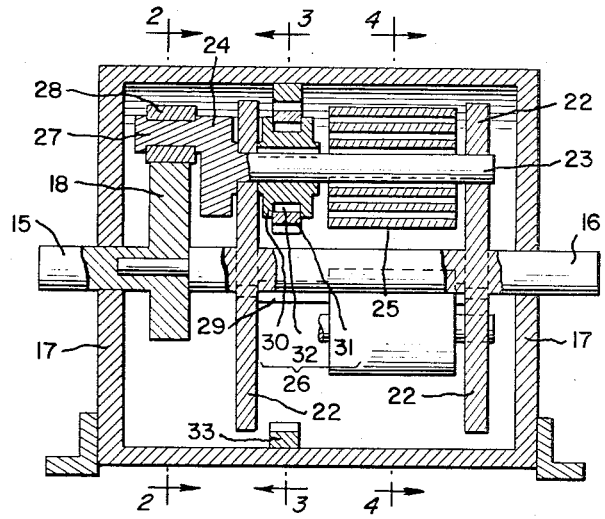
FIG. 1 is a longitudinal sectional view of one embodiment of the plate cam type spring torque converter according to the present invention.

In the embodiment of the spring torque converter of the present invention shown in FIGS. 1 to 4, a driving shaft 15 is connected with the output shaft of a prime mover and a driven shaft 16 is connected with the driven device. Shafts 15 and 16 are rotatably mounted in a fixed housing 17. Affixed to driving shaft 15 is a plate cam 18 having a sharp point 19 extending in the radial direction, a bottom portion 20 and a slope portion 21 descending at a small inclination from the sharp point 19 to the bottom portion 20. Affixed to driven shaft 16 is a shaft carrier comprising spaced carrier plates 22 on which three rocking shafts 23 are mounted at points equally spaced around the circumference and extending parallel to the driven shaft 16. A rocking lever 24, the inner end of an energy transmitting spring 25 and an accelerating wheel 26 are affixed to each rocking shaft. Affixed to each rocking lever 24 is a rocking pin 27 on which is loosely mounted a sliding wheel 28, which slides on slope portion 21 of plate cam 18. The outer end of each energy transmitting spring 25 is fixed to a spring supporting rod 29 mounted between shaft carrier plates 22. Each accelerating wheel 26 constitutes a one-way coupling device consisting of an inner race 30, an outer race 31 and a clutch member 32, said inner race 30 being fixed to rocking shaft 23 and the outer surface of said outer race 31 having gear teeth thereon. The clutch member 32 is so designed that when the outer race 31 is kept fixed and a torque is exerted on the inner race 30 in a direction opposite to the direction of rotation of the driving shaft, the inner and outer races are interlocked. A reaction wheel 33 is secured to fixed housing 17, the inner surface of said reaction wheel having inwardly directed gear teeth in meshing relation to the teeth on the outer races 31 of the accelerating wheels 26.

In operation, when the driven shaft 16 carries a considerable load and driving shaft 15 and plate cam 18 rotate in the direction indicated by the arrow (FIG. 2), sliding wheels 28 slide upwardly along the slope portion 21 of plate cam 18 from the bottom portion 20 to the sharp point 19 and rocking lever 24 rotates in the direction indicated by the right-hand arrow (FIG. 2), said direction being the same as the direction of the rotation of the driving shaft. As a result, the strain in energy transmitting spring 25 increases and driven shaft 16 receive the primary torque $T_1$ according to the following formula:

$$T_1 = H \cdot F \cdot \tan \rho$$

Where:

$F$ = the force of sliding wheel 28, as supplied thereto by the restoring force of energy transmitting spring 25, on slope portion 21 of plate cam 18 tending to push the same toward the axis of driving shaft 15;

$H$ = the distance from the axis of driving shaft 15 to the point where plate cam 18 contacts sliding wheel 28;

$\rho$ = the angle of inclination of the slope of plate cam 18 at the point where plate cam 18 contacts sliding wheel 28.

Since the inner race 30 and outer race 31 on the accelerating wheel 26 at that instant are in an idling condition, accelerating wheel is not affected by the reaction wheel 33. When the load applied to the driven shaft can be rotated by the primary torque only, the driven shaft and the driving shaft rotated in a directly coupled state. However, if the load applied to the driven shaft becomes larger and the driven shaft cannot be rotated by the primary torque only, the plate cam 18 will rotate relative to sliding wheel 28 and sliding wheel 28 will eventually reach the sharp point of plate cam 18 and move past the sharp point, tending to rotate suddenly in a direction opposite to the direction in which the driving shaft is rotating (left hand arrow FIG. 2) by virtue of the restoring force of energy transmitting spring 25.

When rocking shaft 23 rotates in this direction, inner race 30 is locked with outer race 31 so that the restoring force of energy transmitting spring 25 becomes effective between housing 17 and shaft carrier 22, and the secondary torque is applied to the driven device. The secondary torque $T_2$ is according to the following formula:

$$T_2 = T_m \frac{Z_4}{Z_3}$$

Where:

$T_m$ = the torque of energy transmitting spring 25 when sliding wheel 28 arrives at sharp point 19;
$Z_3$ = number of teeth in outer race 31;
$Z_4$ = number of teeth on reaction wheel 33.

Driven shaft 16 rotates by virtue of the secondary torque at the same time rocking shaft 23 rotates in the direction opposite to the direction of driving shaft 15. The strain in energy transmitting spring 25 decreases, sliding wheel 28 approaches the bottom of plate cam 18 and plate cam 18 again contacts sliding wheel 28 during the further rotation of driving shaft 15. This operation is repeated.

When the load is so large that driven shaft 16 does not rotate, rocking shaft 23 does not rotate and there is no relative movement between the inner and outer races 21 and 23, the strain in energy transmitting spring 25 does not decrease and sliding wheel 29 does not rotate to the bottom portion of plate cam 18, so that the prime mover will idle. The torque $T_2m$ acting on the load under this condition is expressed as follows, since three springs are provided:

$$T_2 m = 3 T_m \frac{Z_4}{Z_3}$$

If the ratio $\gamma$ is defined as follows:

$$\gamma = \frac{N_2}{N_1}$$

Where:

$N_1$ = number of revolutions of driving shaft 15
$N_2$ = number of revolutions of driven shaft 16 the apparatus shown in FIG. 1 changes speed automatically when $\gamma$ is in a range from 0 to 1. The apparatus can be described as a plate cam type spring torque converter.

Figure 2:
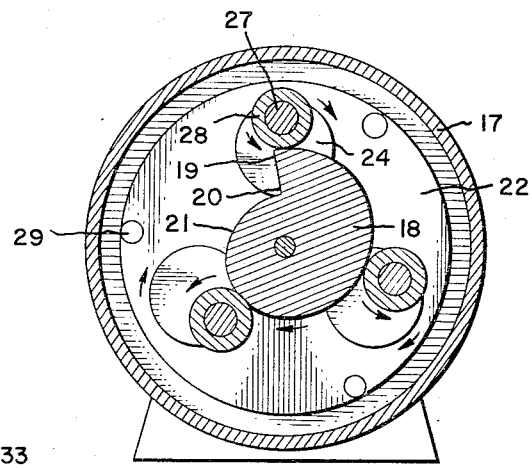
FIG. 2 is a sectional view taken along the line 2—2 in FIG. 1.
Figure 3:
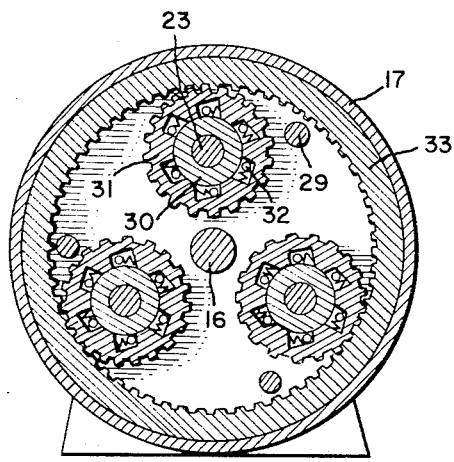
FIG. 3 is also a sectional view taken along the line 3—3 in FIG. 1.
Figure 4:
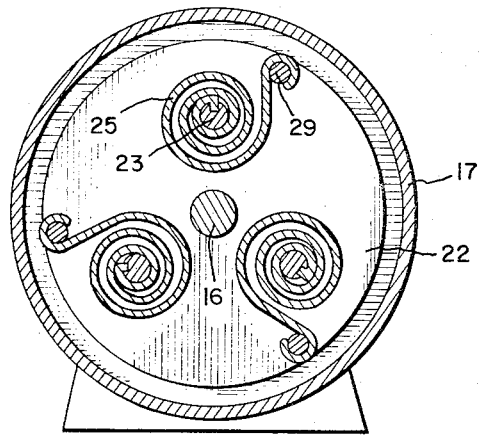
FIG. 4 is also a sectional view taken along the line 4—4 in FIG. 1.

In the apparatus, "the spring action converter" is comprised of the following elements: fixed housing 17, driving shaft 15, plate cam 18, shaft carrier 22, rocking shaft 23, rocking lever 24, rocking pin 27, sliding wheel 28 and energy transmitting spring 25 and "the secondary torque generator" is comprised of the following elements: shaft carrier 22, rocking shaft 23, energy transmitting spring 25, accelerating wheel 26, reaction wheel 33, fixed housing 17 and driven shaft 16. The apparatus is shown in FIG. 2 at a point where the apparatus is stable and $\gamma=1$, and the apparatus can be described as "a spring torque converter of uniform speed."

Figure 5:
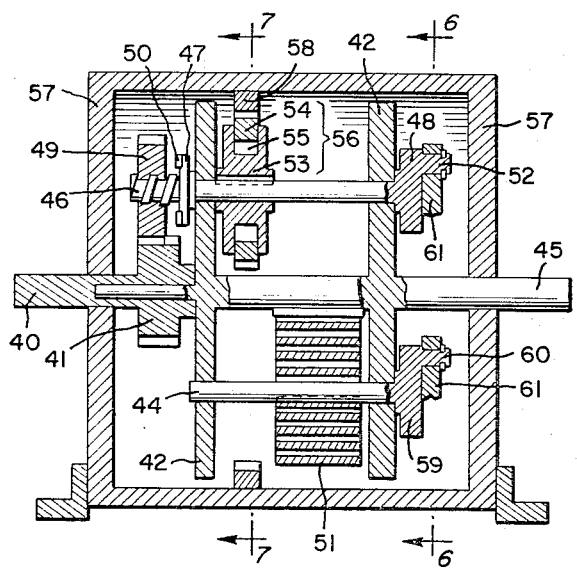
FIG. 5 is a longitudinal sectional view of another embodiment of the spring torque converter according to the present invention.
Figure 6:
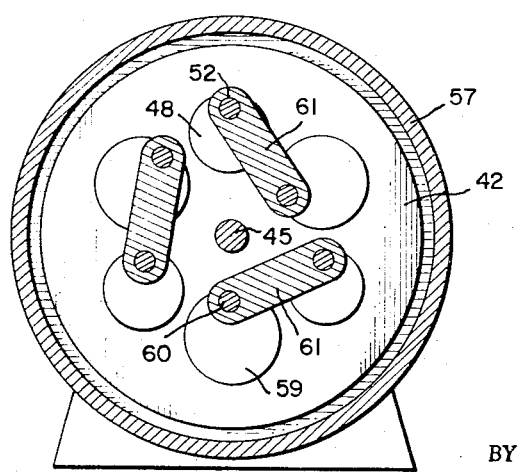
FIG. 6 is a sectional view taken along the lines 6—6 in FIG. 5.

A second embodiment similar to that of FIGS. 1–4 is shown in FIGS. 5 and 6. A sun gear 41 is fixed to a driving shaft 40 and a shaft carrier comprised of four shaft carrier plates 42 is fixed to a driven shaft 45. Three crank shafts 43 and three rocking shafts 44 are rotatably mounted between plates 42 on the shaft carrier and are equally spaced around and parallel to driven shaft 45.

A rod 46 having a thread thereon and a stopper 47 are mounted on one end of each crankshaft 43 and a crank arm 48 is fixed on the other end of each crankshaft 43. A planetary gear 49 meshing with sun gear 41 is threadedly engaged with rod 46 and a thrust bearing 50 is provided on stopper 47.

As driving shaft 40 rotates, planetary gear 49 shifts to the right in FIG. 5 and contacts stopper 47, and at the same time crankshafts 43 begin to rotate. When the rotating speed of crankshafts 43 becomes greater than the rotating speed of planetary gear 49 due to the restoring force of a spiral spring 51, planetary gear 49 moves to the left in FIG. 5, leaving stopper 47. It is in order to separate planetary gear 49 easily from stopper 47 that a thrust bearing 50 is provided on stopper 47. A crank pin 52 is fixed on each crank arm at a point spaced from the axis of crankshaft 43. An accelerating wheel 56 comprised of an inner race 53, a toothed outer race 54 and a clutch member 55 is mounted on each crankshaft 43. A toothed reaction wheel 58 meshing with outer races 54 is that when outer race 54 is fixed and a torque is applied to inner race 53 in the direction opposite to the rotating direction of driving shaft 40, clutch member 55 is locked. A rocking lever 59 is fixed to each rocking shaft 44 and a rocking pin 60 is fixed to each rocking lever 59 at a point spaced from the axis of rocking shaft 44. Rocking pins 60 are connected to crank pins 52 by means of links 61. Because the eccentricity of rocking pins 60 is larger than the eccentricity of crank pins 52, the rotation of crankshafts 43 causes rocking shafts 44 to rock. The inner end of each energy transmitting spring which is a spiral spring 51 is fixed to a rocking shaft 44 and each outer end of spiral spring 51 is fixed to driven shaft 45 or shaft carrier 42 so that the rocking of rocking shafts 44 causes the strain in spiral springs 51 to increase and decrease repeatedly. The points at which sun gear 41 and the three planetary gears 49 mesh are so determined that the times when the strains in the three spiral springs 51 begin to increase are at equal intervals.

If, when the load on the driven shaft is large, driving shaft 40 rotates, crankshafts 43 rotate in the direction opposite to the direction of rotation of driving shaft 40, and, because clutch members 55 are locked, the ratio $\gamma_0$ of the number of revolutions of driven shaft 45 to the number of revolutions of driving shaft 40 is determined by the planetary gear mechanism as follows:

$$\gamma_0 = \frac{Z_1 Z_3}{Z_1 Z_3 - Z_2 Z_4}$$

Where:

$Z_1$=number of teeth of sun gear 41
$Z_2$=number of teeth of planetary gear 49
$Z_3$=number of teeth of accelerating wheel 56
$Z_4$=number of teeth of reaction wheel 58

On the other hand, rocking shafts 44 rotate during the rotation of crankshafts 43, the strain in spiral springs 51 increases, a torque is induced in driving shaft 40 due to the restoring force of spiral springs 51, and at the same time, the same torque is applied to the driven device. The torque is the primary torque above mentioned. When the driven device can be rotated solely by the primary torque, driving shaft 40 is directly connected with driven shaft 45. Because clutch members 55 in accelerating wheels 56 are idle, reaction wheel 58 does not prevent driven shaft 45 from rotating. Under these conditions, crankshafts 43 and rocking shafts 44 revolve with the shaft carrier but do not rotate relative thereto.

When the load on the driven shaft 45 is too large to enable driving shaft 40 to be directly connected with driven shaft 45 by means of the primary torque, crankshafts 43 continue to rotate, the strain in spiral springs 51 becomes a maximum and the direction of rotation of rocking shafts 44 is reversed so that the restoring force of spiral springs 51 accelerates rocking levers 59, crank arms 48 and crankshafts 43. Under these conditions, planetary gear 49 moves away from stopper 47 so that it is possible that the speed of the rotation of crankshafts 43 becomes larger than the speed of the rotation of planetary gear 49. The restoring force of the spring reacts against housing 57 since clutch member 55 is locked, and the device is as shown in FIG. 5. Thus, the secondary torque acts on the driven device. When the speed of rotation of crankshafts 43 is larger than the speed of the rotation of planetary gear 49, the ratio $\gamma = (N_2/N_1)$ becomes larger than above mentioned $\gamma_0$, in other words, if the load is small ratio $\gamma$ approaches 1. Since three spiral springs apply the secondary torque to the operation device successively, the spring torque converter shown in FIG. 5 automatically changes its speed in accordance with the load under conditions such that the ratio of rotation is between $\gamma_0$ and 1.

In FIG. 7 is shown a modified accelerating wheel and reaction for use in place of the wheels 56 and 58 in FIG. 5. Reaction wheel 58 in FIG. 5 is replaced by a frictional reaction wheel 64 having a frictional surface on the inner surface thereof and is mounted in housing 57 as shown in FIG. 7, and accelerating wheel 56 is replaced by three frictional accelerating wheels 66, each having a frictional projection 65 on half the periphery thereof and mounted on one of the crankshafts 43 as shown in FIG. 7. Each frictional accelerating wheel 66 is mounted on a crankshaft 43 so that the frictional accelerating wheel 66 does not contact the friction reaction wheel 64 during the half cycle of rotation during which spiral ring 51 absorbs the strain energy, but does contact reaction wheel 64 through frictional projection 65 during the half cycle of rotation in which spiral spring 51 discharges the strain energy. In the modified apparatus, driven shaft 45 automatically changes its speed in response to load changes.

In the apparatus shown in FIG. 5, "the spring action converter" is comprised of the following elements: Fixed housing 57, driving shaft 40, sun gear 41, shaft carrier 42, crankshaft 43, planetary gear 49, link 61, rocking shaft 44 and spiral spring 51, and "the secondary torque generator" is comprised of fixed housing 57, shaft carrier 42, rocking shaft 44, spiral spring 51, link 61, crankshaft 43, accelerating wheel 56 or frictional accelerating wheel 66 and reaction wheel 58 or frictional reaction wheel 64. The apparatus of FIG. 5 in which an accelerating wheel 56 or frictional accelerating wheel 66 is mounted on each crankshaft 43 can be described as a rotating reaction spring torque converter.

In FIG. 5, the mechanism comprised of rod 46 having the thread thereon, stopper 47 and planetary gear 49 serves to prevent the strain energy in the spiral spring 51 from feeding back to the prime mover and the mechanism can be described as an "energy feedback preventing device." Another embodiment of an energy feedback preventing device which can be substituted for that shown in FIG. 5 is shown in FIGS. 8 and 9. In FIGS. 8 and 9, each crankshaft 43 and a planetary gear 70 thereon can rotate freely relative to each other, and they have a projection 71 and a projection 72, respectively. An elastic member 73 is mounted on projection 71. It is clear from the construction shown in FIGS. 8 and 9 that the apparatus acts as an energy feedback preventing device.

Figure 11:
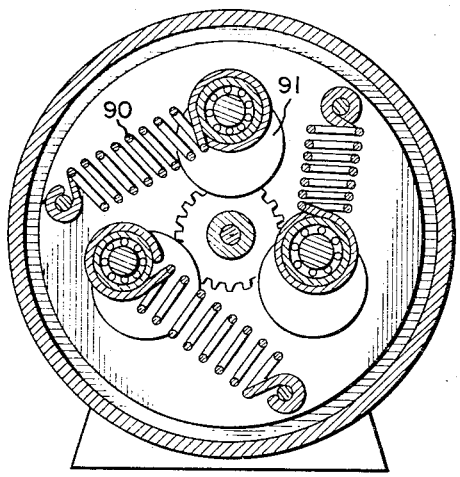
FIG. 11 is a sectional view taken along the line 11—11 in FIG. 10.

Another embodiment of apparatus is shown in FIGS. 10 and 11.

This apparatus is identical to the apparatus shown in FIG. 5 in its effect, but not in its construction. In the apparatus shown in FIG. 5, rocking shafts 44 are needed to enable the expansion and contraction of the energy transmitting spiral springs. However, no such rocking shafts are needed for the apparatus as shown in FIG. 10, since the energy transmitting springs 90 are helical springs and one end of each spring can be secured directly to a crank pin 91 and the other ends to anchoring pins 94 on the carrier 95. In place of the combination of the accelerating wheel 92 and the reaction wheel 93 employed for producing secondary torque in the apparatus shown in FIG. 10, the combination of the frictional accelerating wheels with the frictional reaction wheel as described in FIG. 7 can be used.

Figure 12:
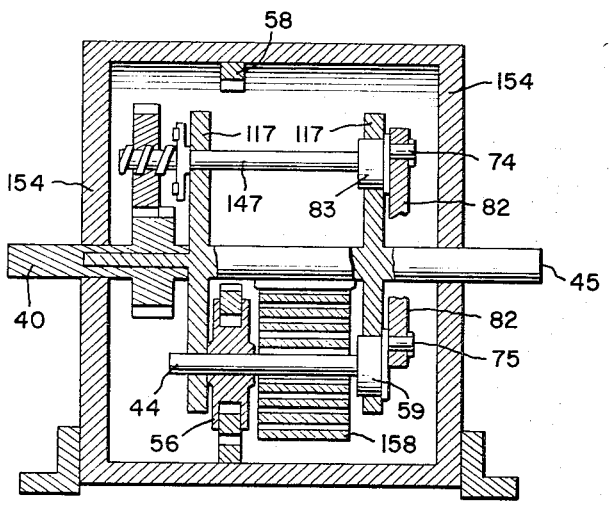
FIG. 12 is a longitudinal sectional view of a further modification of a spring torque converter according to the invention.

The apparatus shown in FIG. 12 is essentially the same as the apparatus shown in FIG. 5 except that the accelerating wheels 56 are mounted on rocking shafts 44 and the outer races 54 of the accelerating wheels 56 mesh with reaction wheel 58. The construction of clutch member 55 is such that when outer race 54 is fixed and a torque in a direction opposite to the direction of rotation of driving shaft 40 is applied to inner race 53, clutch member 55 is locked and the strain in the spiral springs 158 increases when rocking shafts 44 rock in the direction of rotation of driving shaft 40. The apparatus in which accelerating wheels 56 are mounted on the rocking shafts 44 can be described as a "reciprocating reaction spring torque converter" and in the apparatus driven shaft 45 varies its speed automatically in response to the load.

Figure 13:
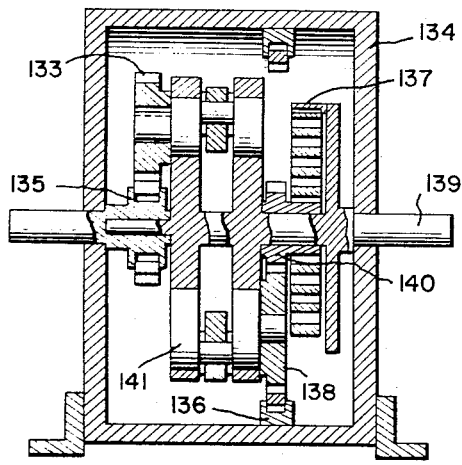
FIG. 13 is a longitudinal sectional view of another embodiment of a spring torque converter according to the invention.

All of the types of apparatus shown in FIGS. 1 to 12 have energy transmitting springs. However, these types of apparatus can be readily modified to provide any number of energy transmitting springs. An embodiment in which only one energy transmitting spring is provided is shown in FIG. 13. In the apparatus shown in FIG. 13, the energy feedback preventing device includes a one-way coupling device forming part of a sun gear 135. Another one-way coupling device is included as part of reaction wheel 136, whereas the one-way coupling device is included in accelerating wheel 56 in FIG. 12. The inner end of each energy transmitting spring 158 is fixed to a rocking shaft 44 in FIG. 12, whereas in the device of FIG. 13 the inner end of the single energy transmitting spring 137 is fixed to a gear 140 rotatably mounted on a driven shaft 139. Gear 140 is meshed with an accelerating wheel 138. The two rocking shafts 141 in FIG. 13 reverse the direction of rocking simultaneously. The operation and effect of the apparatus shown in FIG. 13 is substantially the same as the apparatus shown in FIG. 12.

In all of the types of apparatus described above, the accelerating wheel and the reaction wheel can include a one-way coupling device or overrunning device, and the inner end of the energy transmitting spring can be fixed to the rocking shaft or can be indirectly engaged with the rocking shaft as shown in FIG. 13. In both cases, the strain in the energy transmitting spring increases or decreases due to the rocking motion of the rocking shaft.

When the apparatus shown in FIG. 13 is modified so that reaction wheel 136 is removed from housing 134 and accelerating wheel 138 meshes with planetary gear 133, the apparatus becomes a rotating reaction spring torque converter. In such an apparatus the planetary gear serves as the reaction wheel. Therefore, in a rotating reaction spring torque converter, the planetary gear may take the place of the reaction wheel.

It is to be understood that this invention has been described only by way of explanation without limitation of the same and that various changes can be made therein within the scope of the appended claims.

What is claimed is:

1. A spring torque converter comprising: a driving shaft, a driven shaft, a fixed housing in which said driving shaft and said driven shaft are rotatably mounted, at least one energy transmitting spring having one end thereof coupled to said driven shaft, a first means coupling the other end of said energy transmitting spring with said driving shaft so that said spring can expand and contract during the relative rotation of said driving shaft and driven shaft, and for disengaging said other end of said energy transmitting spring from said driving shaft, and a second means coupled to said energy transmitting spring for engaging said other end with said fixed housing when said other end is disengaged from said driving shaft due to the excess of the distortion of said spring beyond a predetermined value so that the restoring force of said spring can act on said driven shaft and said fixed housing.

2. A spring torque converter as claimed in claim 1, in which a spring supporting rod is provided to which said spring has the outer end secured, and said first means comprises a plate cam affixed to the driving shaft and having a cam surface comprised of at least one sharp point, a bottom portion, and a slope portion extending from said sharp point to said bottom portion, a shaft carrier affixed to said driven shaft, the one spring supporting rod being mounted on said shaft carrier, at least one rocking shaft rockably mounted on said shaft carrier, a rocking lever affixed to said rocking shaft, a rocking pin affixed to said rocking lever, a sliding wheel loosely rotatably mounted on said rocking pin and contacting the cam surface of said plate cam, the energy transmitting spring having the inner end secured to said rocking shaft, and said second means comprises an accelerating wheel affixed to said rocking shaft, said accelerating wheel including a one-way coupling device comprising an inner race, an outer race having gear teeth on its outer surface and a clutch member between said races, and a reaction gear wheel affixed to said fixed housing in mesh with said accelerating wheel.

3. A spring torque converter as claimed in claim 1 in which a spring supporting rod is provided to which the outer end of said spring is secured, and said first means comprises a sun gear affixed to said driving shaft, a shaft carrier affixed to said driven shaft, said spring supporting rod being mounted on said shaft carrier, at least one crank shaft rockably mounted on said shaft carrier, a planetary gear meshing with said sun gear and having as a part thereof an energy feedback preventing device coupling said driving shaft to said crankshaft, a crank arm affixed to said crankshaft, a crank pin affixed to said crank arm, a link loosely mounted on said crank pin, a rocking pin loosely mounted on said link, a rocking lever affixed to said rocking pin, a rocking shaft affixed to said rocking lever and rockably mounted on said shaft carrier, the energy transmitting spring having the inner end secured to said rocking shaft, and said second means comprises an accelerating wheel affixed to said crankshaft, said accelerating wheel including an overrunning device comprising an inner race, an outer race having engaging means on its outer surface and a clutch member between said races, and a reaction wheel affixed to said fixed housing and engageable with said accelerating wheel.

4. A spring torque converter as claimed in claim 3, in which said engaging means on said outer race are gear teeth and said reaction wheel is a gear wheel in mesh with said gear teeth.

5. A spring torque converter as claimed in claim 3, in which the axis of rotation of said rocking shaft is coincident with the axis of rotation of said driven shaft.

6. A spring torque converter as claimed in claim 3, in which the axis of rotation of said rocking shaft is offset from the axis of rotation of said driven shaft.

7. A spring torque converter as claimed in claim 3, in which said accelerating wheel is a frictional accelerating wheel having a frictional outer surface and said reaction wheel is a friction wheel engageable with said frictional accelerating wheel.

8. A spring torque converter as claimed in claim 7, in which the rotation center of said rocking shaft is coincident with the rotation center of said driven shaft.

9. A spring torque converter as claimed in claim 1 in which said spring has one end affixed to said shaft carrier and said first means comprise a sun gear affixed to said driving shaft, a shaft carrier affixed to said driven shaft, at least one crankshaft rockably mounted on said shaft carrier, a planetary gear meshing with said sun gear and including an energy feed-back preventing device coupling said driving shaft to said crankshaft, a crank arm affixed to said crankshaft, a crank pin affixed to said crank arm, said one energy transmitting spring having the other end loosely mounted on said crank pin, and said second means comprises an accelerating wheel fixed to said crankshaft, said accelerating wheel including an overrunning device comprising an inner race, an outer race having engaging means on its outer surface and a clutch member between said races, and a reaction wheel affixed to said fixed housing and engageable with said accelerating wheel.

10. A spring torque converter as claimed in claim 9, in which the engaging means on said accelerating wheel outer race are gear teeth and said reaction wheel is a gear wheel in mesh with said gear teeth.

11. A spring torque converter as claimed in claim 9, in which said accelerating wheel is a frictional accelerating wheel having a frictional surface on the outer race and said reaction wheel is a frictional reaction wheel frictionally engageable with said frictional accelerating wheel.

12. A spring torque converter as claimed in claim 1, in which a spring supporting rod is provided to which one end of said spring is secured, and said first means comprise a sun gear affixed to said driving shaft, a shaft carrier affixed to said driven shaft, the spring supporting rod being mounted on said shaft carrier, at least one crankshaft rockably mounted on said shaft carrier, a planetary gear meshing with said sun gear and having as a part thereof an energy feedback preventing device coupling said driving shaft to said crankshaft, a crank arm affixed to said crankshaft, a crank pin affixed to said crank arm, a link loosely mounted on said pin, a rocking pin loosely mounted on said link, a rocking lever affixed to said rocking pin, a rocking shaft affixed to said rocking lever and rockably mounted on said shaft carrier, the energy transmitting spring having the other end coupled to the rocking shaft, and said second means comprises an accelerating wheel mounted on the rocking shaft and a reaction wheel affixed to the housing adjacent the accelerating wheel and engageable with the reaction wheel.

13. A torque converter as claimed in claim 12 in which the rotation center of said rocking shaft is coincident with the axis of rotation of said driven shaft.

References Cited

UNITED STATES PATENTS

| | | | |
|---|---|---|---|
| 1,461,559 | 7/1923 | Reece et al. | 74—752 |
| 1,522,839 | 1/1925 | Rogers | 74—751 |
| 1,632,695 | 6/1927 | Coleman | 74—751 |

FOREIGN PATENTS

| | | |
|---|---|---|
| 523,006 | 4/1921 | France. |

DONLEY J. STOCKING, *Primary Examiner.*

A. T. McKEON, *Assistant Examiner.*